Jan. 20, 1925.  1,523,877
H. W. KELLER ET AL
METALLIC VEHICLE WHEEL AND METHOD OF AND APPARATUS FOR MAKING SAME
Filed July 6, 1922  2 Sheets-Sheet 1
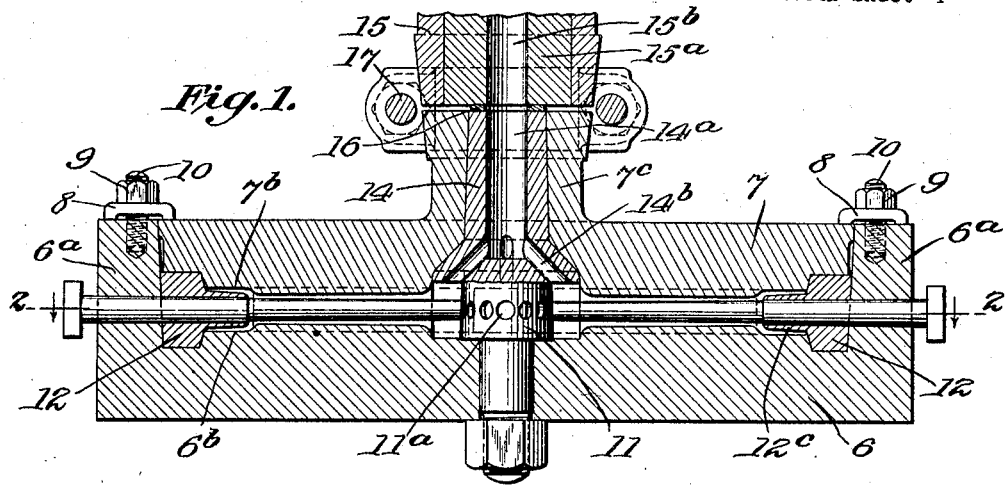
Inventors:
Harry W. Keller, and
Albert T. Keller,
by Spurr Middleton Donaldson + Hall
Attys.

Jan. 20, 1925.  1,523,877
H. W. KELLER ET AL
METALLIC VEHICLE WHEEL AND METHOD OF AND APPARATUS FOR MAKING SAME
Filed July 6, 1922  2 Sheets-Sheet 2
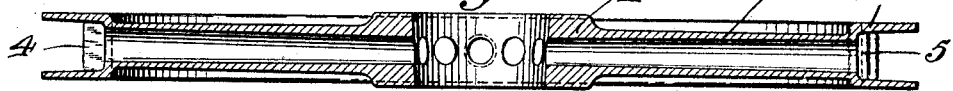
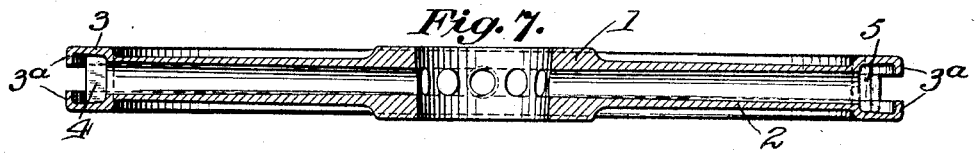
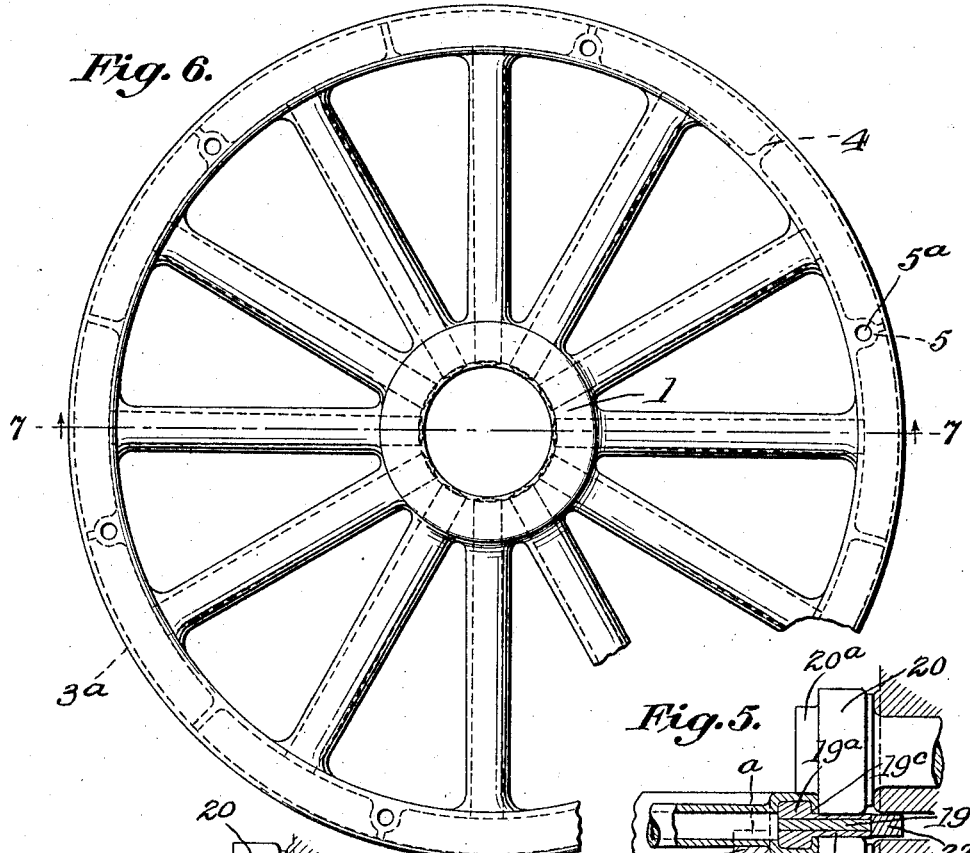
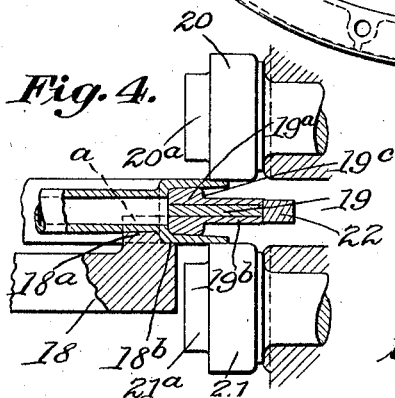
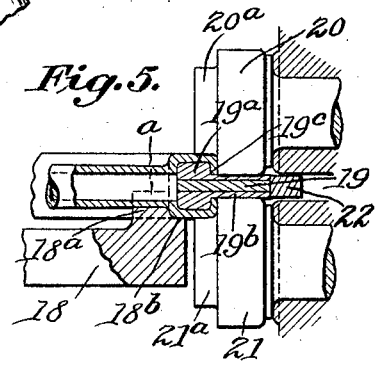
Inventors:
Harry W. Keller, and
Albert T. Keller,
by their Attys.

Patented Jan. 20, 1925.

1,523,877

UNITED STATES PATENT OFFICE.

HARRY W. KELLER, OF PITTSBURGH, AND ALBERT T. KELLER, OF BETHLEHEM, PENNSYLVANIA.

METALLIC VEHICLE WHEEL AND METHOD OF AND APPARATUS FOR MAKING SAME.

Application filed July 6, 1922. Serial No. 573,207.

*To all whom it may concern:*

Be it known that we, HARRY W. KELLER and ALBERT T. KELLER, citizens of the United States, and residents of Pittsburgh and Bethlehem, in the counties of Allegheny and Northampton, respectively, in the State of Pennsylvania, have invented certain new and useful Improvements in Metallic Vehicle Wheels and Methods of and Apparatus for Making Same, of which the following is a specification.

Our present invention relates to an improved vehicle wheel, the method of making the same, and apparatus for carrying out such method.

The invention relates more particularly to the manufacture of wheels of the type used for motor vehicles, though not limited to such use.

One object of the invention is to provide a metal wheel having hub, spokes and felly all made integral or in one piece to afford great strength, and formed hollow to relieve it of excess weight, which may be produced in an expeditious and economical manner, and which will result in a strong and durable one-piece or integral wheel.

With these and other objects in view, the invention includes the novel method and apparatus hereinafter described, the nature and scope of our invention being defined and determined by the claims appended hereto.

Our invention will be described in connection with the accompanying drawings which illustrate apparatus for making the wheel, and by the aid of which drawings the method will be more readily understood.

In these drawings:—

Figure 1 is a transverse sectional view of a forming mold and core, taken in a plane coincident with the axis of the mold.

Fig. 2 is a section on line 2—2 of Fig. 1.

Fig. 3 is a sectional view of the wheel article produced by the apparatus shown in Figs. 1 and 2.

Fig. 4 is an elevational view partly broken away and partly in section, showing the flange bending rolls in the position assumed at the commencement of the bending or rolling operation.

Fig. 5 is a similar view with the parts in the position assumed at the completion of the said operation.

Fig. 6 is a plan view of the completed wheel, and

Fig. 7 is a section on line 7—7 of Fig. 6.

Referring by reference characters to these drawings:—

A distinguishing feature of the present invention is that in our method of manufacture, we first form by casting, a metal wheel body having an integral hub, hollow spokes, and rim of channel form, the wheel body being of greater diameter than the finished article, and thereafter we bend or roll down the peripheral margins of the flanges to form a peripheral surface to sustain the usual tire carrying rim.

Figure 3 shows the wheel body as it emerges from the mold, which body comprises the hub 1, spokes 2, and felly forming portion 3, the spokes being formed hollow, and the bore of the spokes being continued into the hub as shown to reduce weight and eliminate surplus metal. The felly is formed of channel shape as shown in said figure, the side flanges or walls of the channel being preferably substantially parallel, and their inner portions being connected by transverse bracing webs 4 and bolt carrying webs 5. The said flanges are of such width that the outer portions thereof are adapted to be bent or rolled over at right angles to the plane of the wheel, as indicated at $3^a$ in Figure 7 the article or felly thereof being heated at the time of bending.

These rolled over portions afford a broad bearing surface for the customary metal tire carrying rim, and the webs 4 and 5 serve to support said portions at frequent intervals. Bolt holes $5^a$ are formed through webs 5 and adjacent portions of the side flanges to receive the usual rim retaining bolts (not shown).

For casting the wheel above described, we use the mold shown in Figures 1 and 2, in which 6 and 7 represent complementary mold sections each having a mold cavity or cavities shaped to conform to approximately one-half of the wheel member to be cast therein. Preferably the mold member 6 has an annular flange $6^a$ within which the member 7 fits and is held during the molding operation by clamps 8 secured by nuts 9 on the bolts 10 tapped into the said member $6^a$. The parting line of the mold formed by the members 6 and 7 preferably coincides with the center line of the spokes. Located centrally within the hub forming cavity is a core plug member 11 which forms the bore of the hub. The mold sections 6 and 7 are provided with annular rebates or grooves 6b and 7b within which is placed a ring 12 composed of segmental sections to enable it to be removed after the wheel body has been cast, such segmental ring having transverse recesses 12a and 12b of proper shape to form the web or lug members 4 and 5 hereinbefore referred to, these recesses being formed in a reduced inwardly extending portion or flange 12c of the ring 12, which flange 12c is shaped to correspond to the interior of the channel of the wheel felly. Holes are drilled through outer rim or flange 6a of the mold and through the segmental ring in alignment therewith, through which holes are inserted core pins 13, the inner ends of which are seated in recesses in the core plug 11, as indicated at 11a. These core pins form the hollow or tubular portions in the spokes and hub. When the mold and core parts above referred to are assembled in the positions shown in Figures 1 and 2, there is provided therein a mold cavity, which when filled with molten metal, forms a wheel body of the shape shown in Figure 3. In forming the wheel body, we introduce molten metal, in any suitable manner. Preferably the mold member 7 has a neck 7c within which is placed a runner 14 of refractory material, which has a central bore 14a and lateral passages 14b leading therefrom to the hub forming cavity. The molten metal may be led through a supply member 15 having a refractory lining 15a provided with a passage 15b for the molten metal, the source of which is not shown in the drawings. A mud or packing ring 16 is provided between the abutting ends of the refractory linings 14 and 15a, and connection is made by suitable clamping or attaching means indicated conveniently at 17.

The wheel body or blank having been cast by the use of the apparatus shown in Figures 1 and 2 into the form shown in Figure 3, it is then necessary to bend over or roll down the margins of the felly flanges into the position shown in Figure 7. This is preferably accomplished by mechanism shown in Figures 4 and 5, in which 18 is a rotary table mounted to be rotated in any suitable manner and by any suitable means (not shown), this table having an annular raised portion 18a provided with transverse grooves to receive the spokes, and an annular seat 18b to support the felly. The flange 18a is projected upward between the spokes as indicated at a, these upwardly projecting portions bearing against the inner face of the felly between the spokes and supporting it against any inward thrust due to the action of the bending rolls hereinafter described. Before the rolling action is performed, there is inserted in the channel of the felly, or between the two side flanges thereof, a compound supporting ring or member, comprising a central ring 19 and two outside rings 19a, all of them being segmental to permit of their insertion and withdrawal. The outer rings 19a have reduced extensions 19b, the outer edges of which are flush with the outer edge of the ring 19, and these reduced portions form shoulders 19c against which the margins of the flanges are forced by the action of the rolls 20 and 21. The segmental rings are held in position during the rolling operation by a keeper ring 22. The rolls 20 and 21 have reduced extensions 20a and 21a which, at the completion of the rolling operation with the margins of the flanges, have been rolled down against the sides of the felly, as shown in Figure 5.

As the manner in which the rotary wheel supporting member 18, or turn table and the rolls 20 and 21 are mounted and operated, forms no part of the present invention, illustration thereof is deemed unnecessary.

By the use of the method and apparatus hereinbefore described, we are enabled to construct a one-piece hollow wheel of cast metal without the use of any sand cores or cores which must be destroyed in order to be removed from the mold. Such a wheel may be made of approximately the same dimensions as the wooden wheel customarily used on motor vehicles, and can be fitted out with the same attachments, such as hub centers, demountable rims, brake drums and the like.

The mold and core parts hereinbefore described, would of course, be constructed of a suitable material adapted to permanently retain its form so as to be capable of re-use for an indefinite period, such for example, as a metal adapted for the purpose.

Having thus described our invention, what we claim is:—

1. The herein described method of making metallic vehicle wheels, which consists in forming by casting, a wheel body of suitable metal having integral hub, spoke and channel shaped felly members, and thereafter bending over the margins of the flanges of said channel shaped felly member at right angles to the plane of the wheel.

2. The herein described method of making metallic vehicle wheels which consists in forming by casting, a wheel body of suitable metal having integral hub, spoke and channel shaped felly members, placing within said channel shaped felly member a collapsible supporting ring, and thereafter bending the margins of said felly member over against said supporting ring.

3. The herein described method of making metallic vehicle wheels, which consists in forming by casting, a wheel body of suitable metal having integral hub, spoke and channel shaped felly members, placing within said channel shaped felly member a collapsible supporting ring, and thereafter progressively rolling the marginal portions of said felly members down against said forming ring.

4. Apparatus for the purpose described, comprising a pair of complementary mold sections having mating cavities for forming the hub, spokes and felly of a wheel, said members having annular rebates beyond the felly forming cavities, a sectional ring seated in the space formed by the said annular rebates and having spoke core projections cooperating with the felly cavities, said ring having radial openings and spoke cores inserted through said radial openings and into the spoke cavities.

5. Apparatus for the purpose described, comprising a pair of complementary mold sections having mating cavities for forming the hubs, spokes and felly of a wheel, said members having annular rebates beyond the felly forming cavities and one of said members having a laterally extended peripheral part overlapping the outer edge of the other member, a sectional ring seated in the space formed by the said annular rebates and having spoke core projections cooperating with the felly cavities, said ring and said peripheral part having radial openings and spoke cores inserted through said radial openings.

6. Apparatus for the purpose described, comprising a pair of complementary mold sections having mating cavities for forming the hub, spokes and felly of a wheel, said members having annular rebates beyond the felly forming cavities, a hub core seated in the hub cavity and having peripheral recesses, a sectional felly core seated in said rebates and having radial openings, and spoke cores passing through said rebates and having their inner ends seated in the recesses of said hub core.

In testimony whereof, we affix our signatures.

HARRY W. KELLER.
ALBERT T. KELLER.